W. CHURCHILL.
OPTICAL SYSTEM.
APPLICATION FILED MAR. 22, 1913.

1,081,211.

Patented Dec. 9, 1913.

Witnesses
C. B. Bull
Charles Lowell Howard.

Inventor
William Churchill,
By  Attorneys

UNITED STATES PATENT OFFICE.

WILLIAM CHURCHILL, OF CORNING, NEW YORK, ASSIGNOR TO CORNING GLASS WORKS, OF CORNING, NEW YORK.

OPTICAL SYSTEM.

1,081,211.   Specification of Letters Patent.   Patented Dec. 9, 1913.

Application filed March 22, 1913. Serial No. 756,266.

*To all whom it may concern:*

Be it known that I, WILLIAM CHURCHILL, a citizen of the United States, residing at Corning, in the county of Steuben and State of New York, have invented new and useful Improvements in Optical Systems, of which the following is a specification.

My invention relates to an optical system intended primarily for use in connection with headlights for moving vehicles, but adapted to other types of light-projecting apparatus; and in carrying out my improvement I preferably employ two or more condensing lenses and a reflector of the construction and arrangement and producing the effects herein described.

The objection common to practically all types of light-projecting apparatus heretofore employed has been that a large proportion of the total amount of light emanating from the source of illumination is not utilized by the optical devices for condensing a beam. For example, assuming that the total flux emanating from the source of illumination is represented by 100 per cent., an ordinary silvered mirror of the so-called Mangin type utilizes much less than 50 per cent. of the total flux; a parabolic reflector also much less than the whole, and even a condensing lens in front of the source supplemented by and combined with a spherical or parabolic mirror placed behind the source utilizes little if any more than will any deep parabolic reflector of relatively short focus.

In order to render more effective optical devices intended for the purposes in view, I use a pair of lenses so designed and constructed as to operate relatively to each other when properly adjusted with reference to the source of illumination, and preferably combined so as to coöperate with a mirror located behind the source of illumination. Such mirror may be of silvered glass, polished metal or other suitable material, and I prefer in most cases that it shall be of the spherical type.

Figure 1:
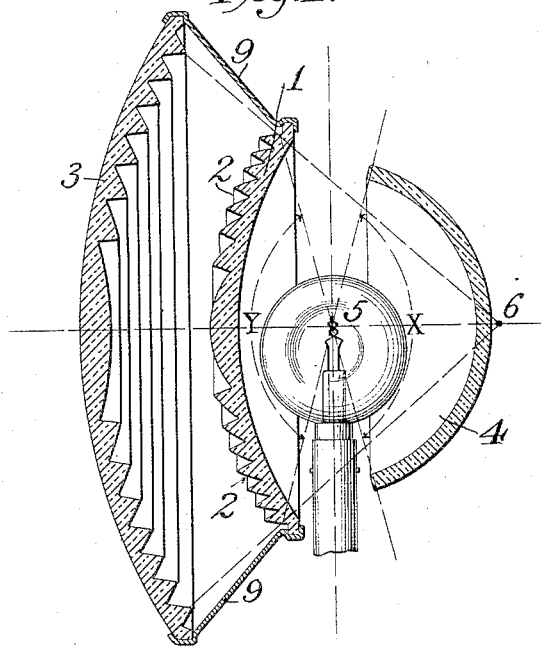
Figure 2:
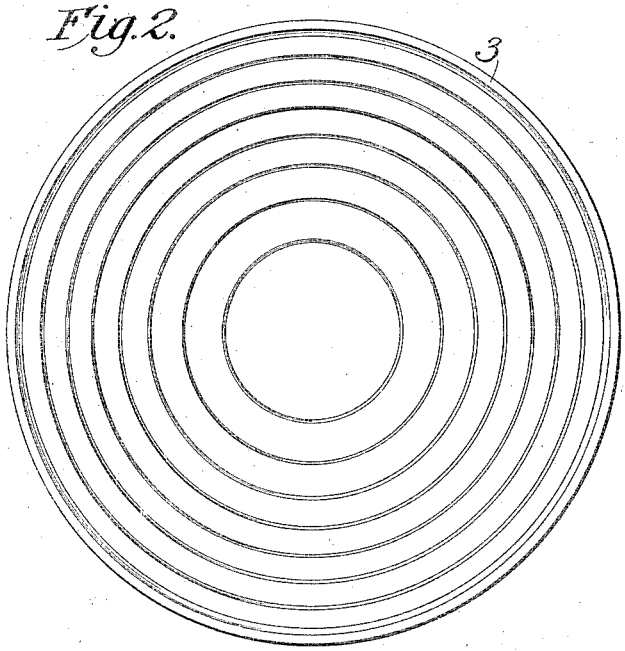
Figure 3:
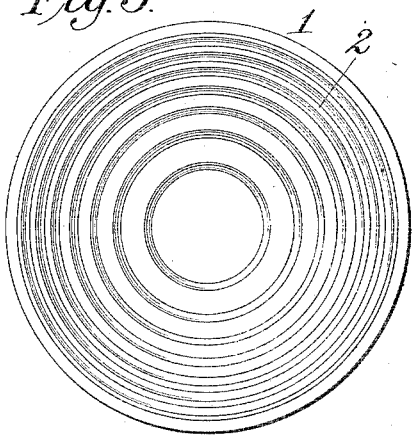

In the accompanying drawing, Figure 1 is a view mainly in section showing the position of the lenses and source of light together with that of the reflector as preferably used in my optical system. Fig. 2 is a front view of the outer or larger lens, and Fig. 3 a similar view of the inner or smaller lens.

It will be seen that the lens system employed, in the case illustrated, consists of two principal elements, 1 and 3. The source of illumination is indicated by 5 and the spherical reflector, placed as stated behind the source, by 4. The rear lens 1, which is the smaller one, is intended to be set in close proximity to the source of illumination 5 so that the entire spherical angle covered by such lens shall be as nearly as possible equal to 190 degrees. Such a lens may in fact be made to cover a spherical angle of 190 degrees, but owing to the necessity of leaving enough space for the lamp, bulb or other means of illumination, practice may require that the spherical angle shall cover not more than 170 or 175 degrees. The lens 1 is constructed with its inner surface concave, and with prismatic zones 2 of spherical curvature disposed on its outer face. These zones, according to usual optical principles, are designed with sufficient curvature to converge the light emanating from a source upon the outer and larger lens 3, having its zones upon its inner face. By the use of the lens 1 an apparent focus is produced at the point 6 behind the source of illumination 5 and the larger or front lens 3 is designed with proper curvature on its various zones to produce a focus at the same point.

With my special lens combination I recommend that a mirror—wherever its use is found convenient—be employed, and, as stated, that it shall preferably be of the spherical type, since such a mirror will augment the intensity of the projected beam by nearly 75 per cent., and thereby produce a combination which is almost holophotal, or in other words, a light-projecting system which condenses in the projected beam nearly all of the light flux emanating from the source—minus only the loss caused by absorption or useless reflection. In the drawing 4 shows such a spherical mirror. It is obvious that a beam of maximum intensity will be secured when a mirror of spherical curvature is used and so placed that its center of curvature coincides with the center of the source of illumination. It is also important to note that in order to secure the best results the mirror 4 should cover as large a spherical angle behind the source of illumination as the lens 1 subtends on the opposite side of the source. Thus in the drawing the angle X is shown as equal to the angle Y. There is a further advantage in my new optical system inasmuch as it permits of the construction of and assemblage of parts in a very light and compact lamp, which is an important consideration in headlights for motor vehicles.

A suitable dust proof housing 9 may be conveniently placed around the pair of lenses so that no dirt can collect on the corrugated surfaces of either lens.

In my present application I make no claim to the general construction of the lamp except as to such parts thereof as embrace the optical system herein described, and the housing, casing, support or other details entering into the structure carrying such optical system may be varied in accordance with the special uses to which the invention is intended to be applied.

Having thus described my invention, I claim:—

1. In an optical system, the combination of two corrugated lenses of different diameters and a source of illumination, the smaller lens being located next to the source of illumination and the larger lens farther therefrom, the smaller lens having its inner face smooth and zones of spherical curvature disposed upon its outer face, and the larger lens having its outer face smooth and zones disposed upon its inner face, the construction and arrangement being such that the smaller lens shall produce an apparent focus behind the source of illumination and the larger lens shall focus at the apparent focus of the smaller lens, substantially as set forth.

2. In an optical system, the combination of two corrugated lenses of different diameters, a source of illumination and a mirror in the rear thereof, the smaller lens being located next to the source of illumination and the larger lens farther therefrom, the smaller lens having its inner face smooth and zones of spherical curvature disposed upon its outer face, and the larger lens having its outer face smooth and zones disposed upon its inner face, the construction and arrangement being such that the smaller lens shall produce an apparent focus behind the source of illumination and the larger lens shall focus at the apparent focus of the smaller lens, substantially as set forth.

3. In an optical system, the combination of two corrugated lenses of different diameters, a source of illumination and a spherical mirror in the rear thereof, the smaller lens being located next to the source of illumination and the larger lens farther therefrom, the smaller lens having its inner face smooth and zones of spherical curvature disposed upon its outer face, and the larger lens having its outer face smooth and zones disposed upon its inner face, the construction and arrangement being such that the smaller lens shall produce an apparent focus behind the source of illumination and the larger lens shall focus at the apparent focus of the smaller lens, substantially as set forth.

In testimony whereof I affix my signature in presence of two witnesses.

WILLIAM CHURCHILL.

Witnesses:
 DELPHINE KEAZLE,
 R. H. CURTIS.